March 25, 1952  J. J. WITTMAN  2,590,593
ADJUSTABLE TOOL
Filed May 15, 1950  2 SHEETS—SHEET 1
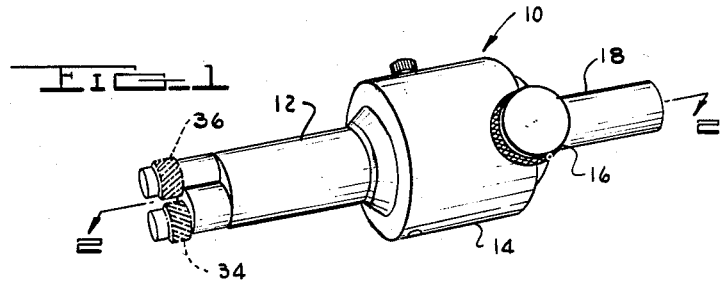
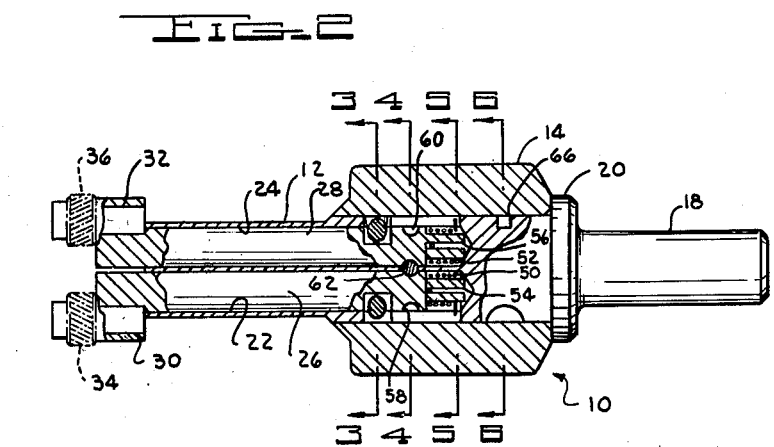
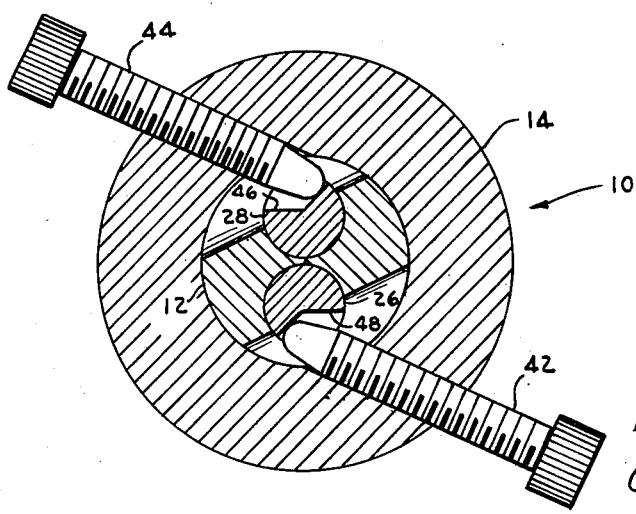
INVENTOR.
JOSEPH J. WITTMAN
BY
Arthur M. Smith
ATTORNEY

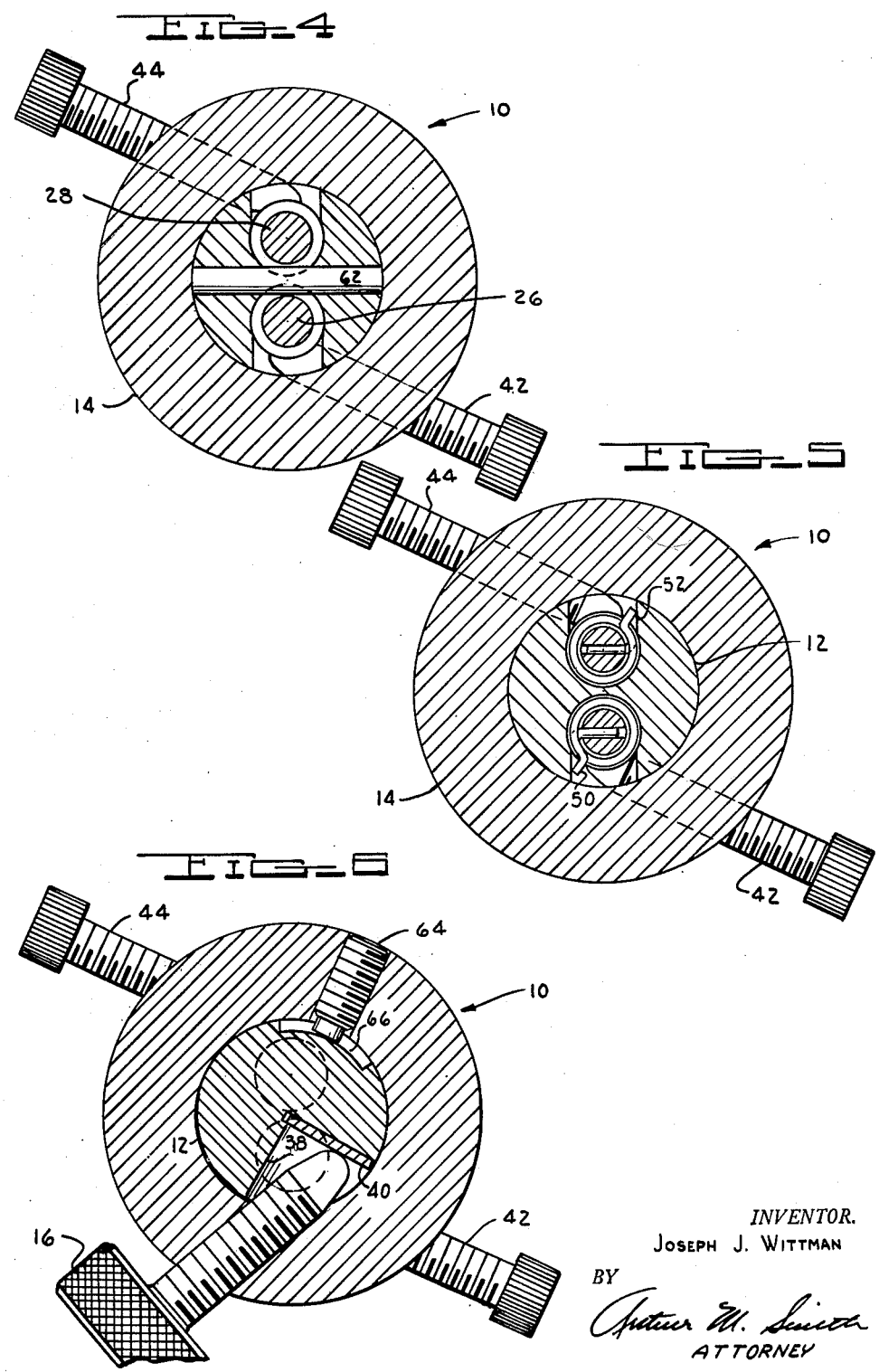

Patented Mar. 25, 1952

2,590,593

UNITED STATES PATENT OFFICE 2,590,593

ADJUSTABLE TOOL

Joseph J. Wittman, Detroit, Mich.

Application May 15, 1950, Serial No. 162,101

2 Claims. (Cl. 80—5.1)

The present invention relates to an adjustable tool for machining internal surfaces of a cylindrical hole, and more particularly to a multipurpose tool adapted principally, but not exclusively, for accurately knurling the interior of a piston pin holes in the bosses of a piston. Reference is made to my co-pending application No. 46,242, filed August 26, 1948, and now abandoned, entitled "Piston and Method of Mounting Wrist Pins," for a more detailed description of the need for, and the operation of, knurling tools in properly installing and fitting wrist pins in pistons. Reference is also made to my co-pending application No. 46,241, filed August 26, 1948, entitled "Knurling Tool," for a description of a tool particularly adapted for knurling the interior of the piston pin hole.

The adjusting tool disclosed herein is one embodiment of the present invention whereby a knurling tool can be quickly and accurately set to permit the operator to perform the knurling operation with the greatest of ease and facility and in a minimum of time. Heretofore, knurling tools of the type shown in my aforesaid co-pending application, No. 46,241 have been used, which are not always readily suitable for mass production methods of operation, since they do not have adjusting means which enable the operator to make adjustments quickly and accurately to conform to the different internal diameters of the piston pin holes of pistons, when such holes are not uniformly the same diameter.

However, it should be understood that the adjusting tool of the present invention is not limited for use as a knurling tool, but can be used for mounting other cutting tools which may be used for cutting internal surfaces of cylindrical holes and the like.

Accordingly, it is a principal object of the present invention to provide an adjustable tool for use in performing cutting operations on the interior surface of a cylindrical hole or the like, and which is constructed and arranged to enable the operator to quickly and accurately adjust the tool so as to provide the desired effective cutting diameter thereof.

It is a further object of the present invention to provide an adjustable tool of the type set forth in the preceding object, wherein the effective cutting edges are in parallel relationship, and which is ruggedly constructed so as to prevent deformation thereof during the cutting operation so that the effective cutting edges will remain parallel.

It is still another object of the present invention to provide an adjustable tool holder adapted for use in readily performing cutting operations on the interior surfaces of a plurality of cylindrical holes of different diameters, and which is suitably adapted to use various types of cutting tools such as knurling rollers, milling cutters, and the like.

Other objects of this invention will appear in the following description and appended claims, reference being had to the accompanying drawings forming a part of this specification wherein like reference characters designate corresponding parts in the several views.

In the drawings:

Fig. 1 is a perspective view of one embodiment of the present invention showing knurling rollers in phantom mounted thereon.

Fig. 2 is a longitudinal view partly in section taken on the line 2—2 of Fig. 1.

Figs. 3, 4, 5, and 6 are sectional views taken on the lines 3—3, 4—4, 5—5 and 6—6 of Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and particularly to Figs. 1 and 2, an adjustable tool 10 is shown having a housing or body member 12 extending through the sleeve member 14. An adjusting screw 16 extends through the sleeve member 14 into engagement with the body member 12 to permit an operator to rotate the body member 12 with respect to the sleeve 14 for a purpose to be more fully described hereinafter.

A shank portion 18 is provided at one end of the body member 12 for holding the tool when in use, and a shoulder 20 is provided against which the sleeve member 14 is seated. The other end of the body member 12 extends outwardly from the sleeve member 14 and has a pair of cylindrical bores 22 and 24 formed therein. Journaled within the bores 22 and 24 are a pair of shafts 26 and 28. Each of the shafts 26 and 28 has an offset portion at its outer end in which are mounted the pins 30 and 32. Each of the pins 30 and 32 are adapted for mounting different types of cutting tools, such as the knurling rollers 34 and 36 shown thereon in phantom.

As can be seen in Fig. 2 of the drawing, the pins 30 and 32 are disposed in parallel relationship so that cylindrical knurling rollers can be mounted thereon enabling their respective cutting edges to be in a parallel cutting relationship. By virtue of the offset position of each of the pins 30 and 32 with respect to the axis of rotation of each of the shafts 26 and 28, the effective cutting diameter can be varied merely by rotating one or both of the shafts 26 and 28. It can be seen that, if desired, a greater number of shafts and knurling rollers or the like can be used with this adjusting tool. In the event that more than two cutting tools are desired to be used, it is only necessary that the offset portions of the shafts be uniformly positioned so that on rotation of the shafts the offset portions will be pivoted radially inwardly or radially outwardly depending on whether a lesser or greater cutting diameter is desired.

Varying the spacing between the knurling rollers 34 and 36 by rotation of the shafts 26 and 28 is accomplished by means of the adjusting screw 16. Referring to Fig. 6 of the drawings, it can be seen that the adjusting screw 16 extends angularly through the sleeve member 14 into the slot or recessed portion 38 of the body member 12. The inner end of the adjusting screw 16 engages the bearing insert 40, so that when the adjusting screw 16 is turned to advance it inwardly, the body member 12 will be rotated with respect to the sleeve member 14.

Also extending through the sleeve member 14 and threadedly mounted therein are the screws 42 and 44. As can best be seen in Fig. 3, the inner ends of these screws are in engagement with the shafts 26 and 28. The screws 42 and 44 extend in the slots or recessed portions 46 and 48 so that when the body member 12 is rotated with respect to the sleeve 14 by turning of the adjusting screw 16, the shafts 26 and 28 will be caused to rotate relative to the body member 12. Thus, as seen in Fig. 3, when the body member 12 is caused to rotate in a counter-clockwise direction, the shafts 26 and 28 will be held against rotation by the screws 42 and 44 and thereby the shafts 26 and 28 will be rotated relative to the housing 12.

In order to keep the insert 40 in engagement with the end of the adjusting screw 16 and the shafts 26 and 28 in engagement with the ends of the screws 42 and 44, spring means are interposed between the shafts 26 and 28 and the body member 12 which tend to rotate the latter with respect to the former. As can best be seen in Figs. 2 and 5, coil springs 50 and 52 are mounted on the ends of the shafts 26 and 28. One end of each spring extends radially outwardly into engagement with the body member 12 and the other end of each spring extends inwardly into the slots 54 and 56 of the shafts 26 and 28. These springs operate to bias the contacting surfaces of the respective shafts and body member into contact with their respective screws when the adjusting screw 16 is turned to withdraw it from the bearing surface 40.

In order to maintain the shafts 26 and 28 in a fixed longitudinal position with respect to one another, annular grooves 58 and 60 are provided in each of the shafts 26 and 28 and through which a pin 62 is extended. The body member 12 is maintained in a fixed longitudinal position with respect to the sleeve member 14 by means of the shoulder 20 and a set screw 64 which extends into the keyway 66.

When it is desired to use the present adjusting tool for knurling operations, the knurling rollers 34 and 36 are mounted on the tool, and the knurling tool is then inserted into the cylindrical holes to be knurled. The knurling rollers are expanded in the holes by advancing the adjusting screw 16 inwardly through the sleeve member 14 until the knurling rollers touch the sides of the cylindrical hole. The tool is then removed and the adjusting screw 16 is advanced a predetermined amount such as for example, by turning the adjusting screw another ½ turn, and the tool is then run through the cylindrical hole performing the desired knurling operation. If the adjusting tool is to be used with other cutting tools, similar adjusting steps can be employed.

From the above description, it can be seen that an adjustable tool is provided for performing cutting operations on the interior surface of cylindrical holes and the like which permit the operator to quickly and accurately set the tool for the desired depth of cut. The tool is sturdily built so that the effective cutting edges of the tool will be maintained in parallel relationship throughout the cutting operation so as to enable very accurate work to be performed.

This tool can be used for performing cutting operations in holes of different diameters while insuring that the optimum results will be obtained in each instance, since the cutting tool will always have its effective cutting edges maintained in parallel relationship in each of the said holes. This adjustable tool also has more universal application than those heretofore known, since it is suitable for use with various types of cutters in addition to knurling rollers.

Having thus described my invention, I claim:

1. An adjustable tool for machining internal surfaces of a cylindrical hole comprising a body member, a plurality of shafts journaled in parallel relationship in said body member, pins mounted in each of said shafts in offset positions and adapted for mounting cutting tools in parallel relationship thereon, a sleeve member mounted for rotation on said body member, means operatively disposed between said sleeve member and said shafts for rotating said shafts relative to said body member, and a screw mechanism for rotating said sleeve member with respect to said body member so that when said screw mechanism is actuated the effective cutting diameter of said tool can be selectively determined.

2. An adjustable tool as claimed in claim 1 wherein the first-named means comprises springs interposed between said shafts and said body member for rotatively biasing said shafts with respect to said body member, and said shafts have slots therein into which screw members angularly extend for opposing the biasing action of said springs.

JOSEPH J. WITTMAN.

REFERENCES CITED

The following references are of record in the file of this patent:

UNITED STATES PATENTS

| Number | Name | Date |
| --- | --- | --- |
| 625,726 | Halifax | May 23, 1899 |
| 964,272 | Kaiserman | July 12, 1910 |